United States Patent

Cronquist

[15] 3,653,568

[45] Apr. 4, 1972

[54] TAPE TRANSPORT MECHANISM

[72] Inventor: Donald H. Cronquist, Los Gatos, Calif.

[73] Assignee: International Business Machines Corporation, Armonk, N.Y.

[22] Filed: July 2, 1970

[21] Appl. No.: 51,926

[52] U.S. Cl. ....................................226/97, 271/74, 274/4 J

[51] Int. Cl. ....................................B65h 17/32

[58] Field of Search ....................271/74; 226/7, 97; 302/11, 302/64, 2; 274/4 J

[56] References Cited

UNITED STATES PATENTS

| | | | |
|---|---|---|---|
| 3,103,850 | 9/1963 | Khoury | 226/97 X |
| 3,235,265 | 2/1966 | Morrison | 274/4 J |
| 3,384,282 | 5/1968 | Vits | 226/97 |
| 3,469,847 | 9/1969 | Kral | 274/4 J |

*Primary Examiner*—Richard A. Schacher
*Attorney*—Hanifin and Jancin and Thomas A. Briody

[57] ABSTRACT

A transport mechanism for a strip of flexible recording tape. The mechanism includes a support having a loop-shaped passageway formed therein. The passageway has a predetermined length and is structured to receive an elongated discontinuous strip of flexible tape having a length slightly less than the median length of the passageway. When the strip of tape is placed in the passageway, the free ends of the strip are closely adjacent to each other. A pneumatic driving force is applied to this tape strip to operate it within the passageway. The tape strip moves through the passageway in a manner very similar to a continuous tape loop.

4 Claims, 7 Drawing Figures

Patented April 4, 1972 3,653,568

2 Sheets-Sheet 1

*INVENTOR*
DONALD H. CRONQUIST

*BY* Thomas A. Briody

ATTORNEY

TAPE TRANSPORT MECHANISM

BACKGROUND OF THE INVENTION

1. Field of the Invention

This invention relates to a novel and improved transport mechanism for reading and writing upon a discontinuous strip of flexible tape.

2. Description of the Prior Art

Closed loop tape transport devices have been known in the prior art. To provide the tape for such devices, a continuous loop of tape has been formed by cutting an extruded tube transversely, splicing cut lengths of stock tape together, or heat forming a tape loop from flat rings of polyester material.

It has also been known in the prior art to manufacture a tape buffer device which reads and writes upon a discontinuous strip of magnetic tape material. Such a buffer device commonly includes an annular groove formed in a fixed support. A strip of magnetic recording tape enters the groove from an external storage area and it moves around the groove so that a magnetic head may either record upon or reproduce signals from the tape during its movement around the groove.

In prior tape loop devices of the general nature referred to, the material and manufacturing costs of the tape loops have been found to be undesirably expensive. In addition, the nature of the tape loop construction and its associated tape loop buffer device has often restricted flexibility of applications.

SUMMARY OF THE INVENTION

An object of this invention is to provide a novel and improved tape transport device which uses a discontinuous strip of magnetic recording tape having a predetermined length.

Another object of this invention is to provide an improved cyclic tape buffer for reading and writing upon a discontinuous strip of magnetic tape.

A further object of my invention is to provide in combination, a discontinuous tape strip and a loop shaped conduit, which physically cooperate to enable the tape to operate as though it were a continuous loop of flexible tape material.

In carrying out my invention, in one form thereof, it is applied to a cyclic tape buffer which includes a loop-shaped conduit having a continuous passageway disposed therein. The passageway has a predetermined length. A strip of flexible magnetic tape having a length slightly less than the length of the passageway is positioned therein so that the free ends of the strip are closely adjacent to each other. A pneumatic driving means is provided for operating the tape strip through the passageway at a substantially uniform speed. One or more transducers are exposed to the passageway and engageable with the tape strip for recording and/or reproducing signals carried on the tape strip. With such an arrangement, the dimensional relationship between the tape and the passageway length is such that when the driving means for the device is actuated to an "on" condition, the strip of tape moves continuously through the passageway of the conduit, along a substantially uniform path. Such a device allows a relatively inexpensive, yet accurately cut, strip of flexible magnetic tape to be used instead of a conventional fabricated tape loop.

BRIEF DESCRIPTION OF DRAWINGS

The foregoing and other objects, features and advantages of this invention will be apparent from the following description of the drawings, in which.

DESCRIPTION OF PREFERRED EMBODIMENT OF INVENTION

Figure 1:
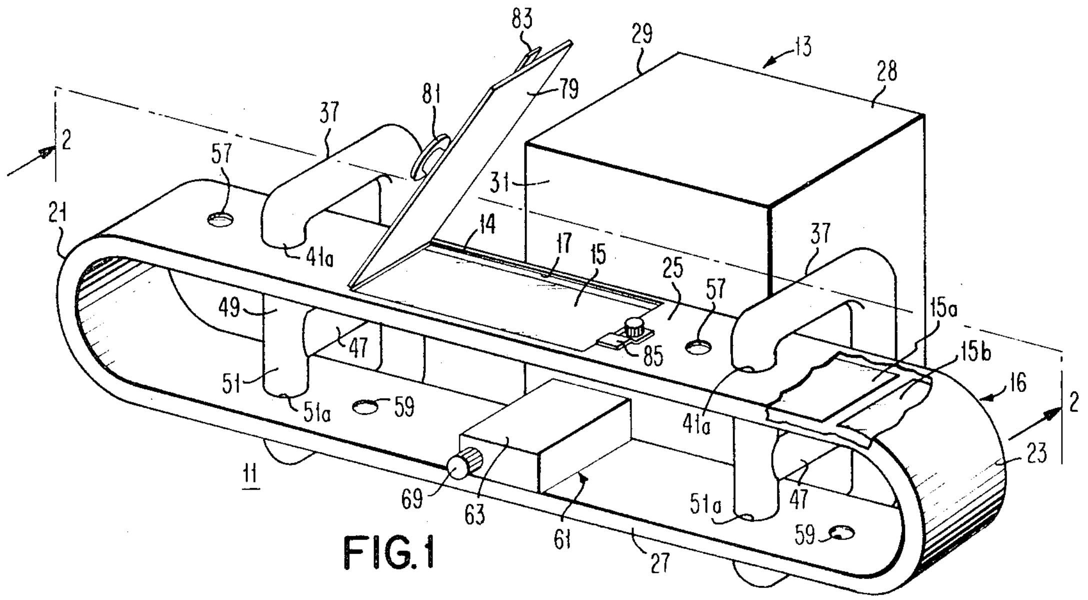
FIG. 1 is a perspective view of a cyclic tape buffer device embodying my invention, in one form thereof.

As shown in FIG. 1, the present invention is advantageously applicable to a cyclic tape buffer 11 which is contained in a suitable housing (not shown). Buffer 11 essentially includes an air flow driving mechanism 13 and one or more openings such as a rectangular aperture 14 for feeding tape 15 into and out of a loop-shaped conduit 16 to record and reproduce on and from the tape 15 by means of one or more associated heads.

Figure 2:
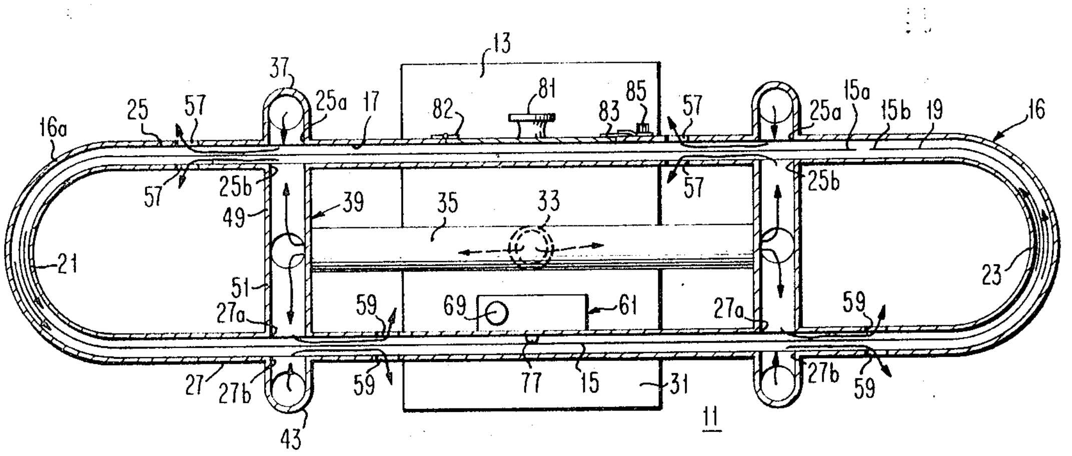
FIG. 2 is a front elevation view of the buffer device of FIG. 1, partially in section and partially broken away to show the location of the tape within the conduit.

From an inspection of FIG. 2, it will be noted that the loop-shaped conduit 16 for the cyclic tape buffer 11 includes a continuous and substantially enclosed passageway or tunnel 17 for movement of a strip of tape 15 within the buffer. More particularly, the conduit 16 assumes, in general, the external profile configuration of a circle which is substantially flattened at two oppositely disposed ends.

Thus, viewing FIG. 2, it will be seen that the conduit 16 includes semicircularly curved ends 21 and 23, the opposed upper and lower ends of which are respectively connected to flat upper and lower conduit sections 25 and 27. As previously mentioned, the conduit 16 has a rectangular aperture 14 formed therein for inserting and removing tape from the passageway of the conduit. For the disclosed embodiment, the aperture 14 is located on the upper surface of conduit 25.

It is important to note that the passageway 17 of conduit 16 is constructed with a predetermined cross-sectional configuration and dimensions and predetermined median length. The width, depth, and length of tape strip 15 is slightly less than the respective width, minimum depth and median length of passageway 17, so that there is sufficient clearance for ready and uniform movement of the discontinuous tape strip 15 within passageway 17. Further ramifications of the dimensional relationship between tape strip 15 and passageway 17 will be set forth hereinafter.

Figure 3:
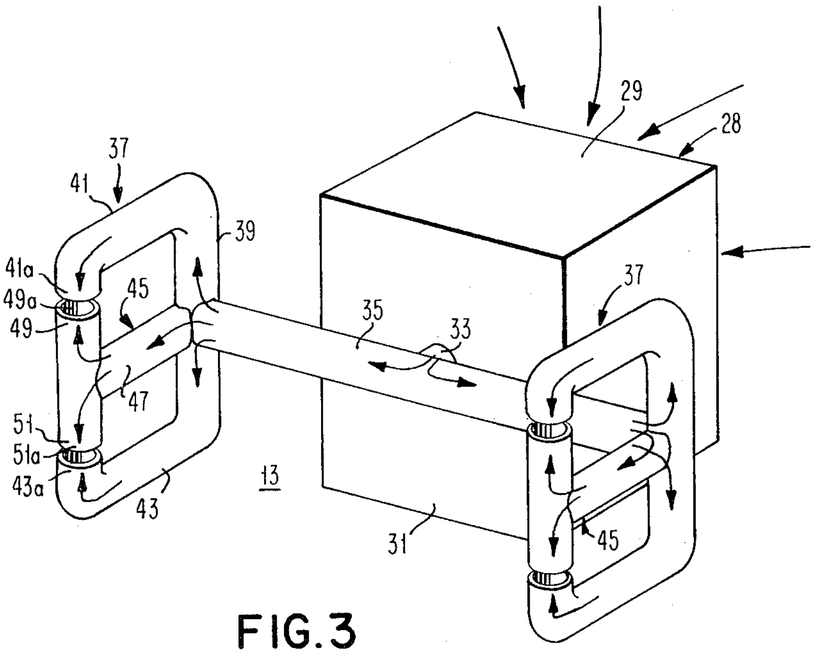
FIG. 3 is a perspective view of the air propulsion mechanism utilized in the cyclic tape buffer device of FIG. 1.

For driving the tape strip 15 in a counterclockwise direction of movement (viewing FIG. 2) within the passageway 17, I have provided the air flow driving mechanism 13. As best shown in FIG. 3, the driving mechanism 13 preferably comprises a suitable fan 28 having a box-shaped casing 29. Frontal face 31 of the casing 29 has an exit nozzle 33 projecting outwardly therefrom. The nozzle 33 is coupled to a longitudinal duct 35 which is disposed generally underneath the upper flat section 25 of the loop-shaped conduit 16, and parallel to the frontal face 31 of the fan box. (See also FIG. 2.)

At each end of the horizontal duct 35 of the driving mechanism 13, there is coupled thereto a flow-diverter tube 37. Each of the tubes 37, viewing FIG. 3, has the general configuration of the numerical figure "8" with interruptions to form two pairs of output nozzles and an inlet passageway. More particularly, each flow diverter tube 37 includes a main vertical section 39 connected respectively at its upper and lower ends to oppositely disposed L-shaped sections 41 and 43. The L-shaped sections 41 and 43 extend horizontally and then vertically toward each other to provide a pair of opposed output nozzles 41a and 43a which face downwardly and upwardly toward each other. In addition to the main vertical section 39 and L-shaped sections 41 and 43 of the flow-diverter tube 37, there is also included a generally T-shaped diverter section 45 which is arranged in such a manner that its main or supporting leg 47 extends perpendicularly from and is coupled to the middle of the main vertical section 39. Diverter section 45 also has a pair of outstretched vertically extensive arms 49 and 51 which provide nozzles *49a* and 51a facing respectively toward the nozzles *41a* and *43a*.

The direction of flow for air emanating from the nozzle 33 of the air-driving mechanism 13, is illustrated by the arrows shown in FIG. 3. Thus, air is blown outwardly from the exiting nozzle 33, into an inlet (not shown) of horizontal duct 35, so that a pressurized fluid is moved both to the left and right of the nozzle 33, along horizontal duct 35. As the air reaches the outer ends of the duct 35, it is diverted into 3 directions, upwardly and downwardly along the main vertical section 39 of the flow-diverter tube 37, and through T-shaped element 45. The air flow entering into vertical section 39 is directed upwardly and downwardly, respectively, into the L-shaped sections 41 and 43, so that it is directed downwardly and upwardly, respectively, from the nozzles 41*a* and 43*a*. Air entering the main vertical section 39 of the flow diverter tube 37 is also passed through the main support section 47 of the T-shaped element 45, so that it moves outwardly, in up and down directions, respectively, from the nozzles 49*a* and 51*a*.

Viewing FIG. 1 and 2, it will be seen that the airflow driving mechanism 13 is coupled to the loop-shaped conduit 16 of the cyclic tape buffer 11 so that the four outlet nozzles 41*a*, 43*a*, 49*a* and 51*a* of each of the two flow-diverter tubes 37 blow air through the wall of the conduit 16, into passageway 17.

More particularly, two pairs of opposed apertures 25*a* and 25*b* (FIG. 2) are formed in the walls of upper flat section 25 of conduit 16. The nozzles 41*a* and 49*a* (FIG. 3) of each of the flow-diverter tubes 37 communicate with one pair of these apertures 25*a*, 25*b*, to enable the air flow driving mechanism 13 to blow air both downwardly and upwardly into the upper flat section 25 of the conduit 15.

In like manner, the nozzles 51*a* and 43*a* (FIG. 3) of each of the flow-diverter tubes 37, are coupled to two pairs of opposed apertures 27*a* and 27*b* formed in the lower flat section 27 of the loop-shaped conduit 16 to blow air downwardly and upwardly into the passageway 17, at two positions located in the bottom of the loop-shaped conduit 16.

To the left of each of the flow-diverter tubes 37 in the upper flat section 25 of conduit 16, there are also formed two pairs of flow-directional apertures 57. The purpose of the flow-directional apertures 57, which are formed in both the top and bottom walls of the conduit 16 (FIG. 2), is to allow air entering the passageway 17 from the output nozzles 41*a*, 49*a* (FIG. 3) of the air drive mechanism 13 to flow outwardly in the direction shown by the arrows in FIG. 2.

In similar manner to the apertures 57, two pairs of opposed apertures 59 are located in the lower flat section 27 of the conduit 15, to the right of the flow-diverter tubes 37. The apertures 59 enable air flow entering into the bottom section 27 of the conduit via nozzles 51*a* and 43*a* to flow to the right and outwardly through the apertures 59, as shown by the arrows of FIG. 2. It will thus be seen that the air flow driving mechanism 13 and the placement of directional apertures 57, 59 relative to the output nozzles 41*a*, 49*a*, and 51*a*, 43*a*, provides a continuous flow of air in a counterclockwise direction (viewing FIG. 2).

For enabling the cyclic tape buffer 11 to record and reproduce information on or from the tape strip 15, a head assembly 61 (FIG. 1) has been provided. Head assembly 61 includes a box-shaped cover 63, having vertical front and back portions 65 and 67 (FIG. 4), respectively. Front portion 65 of the cover 63 rests on the upper surface of lower flat section 27 of the conduit 16 and is suitably secured thereto, such as, for example, by gluing. The back wall 67 of the cover 63 is arranged in parallel relationship to the front wall 65 thereof, and is also suitably secured to the upper surface of lower flat conduit section 27.

The cover 63 of the head assembly 61 serves as a support for head carrier 68. To facilitate lateral adjustment of the head carrier 68 relative to tape 15, threaded shaft 69, with knob 71 attached to its outer end, is extended through the front wall 65 of the cover 63. Shaft 69 is in threaded engagement with head carrier 68, and has its inner end (opposite knob 71) journalled for rotation in back wall 67. For the purpose of properly balancing the head assembly 61 in the cover 63, in addition to the supportive engagement of shaft 69 with the left side of head carrier 63 (FIG. 4), a guiding shaft 75 also extends through the head carrier 68 on the right side thereof. Shaft 75 is secured into engagement with the front wall 65 and rear wall 67 of the cover 63, and it extends loosely through a slightly larger aperture of the head carrier 68 to help guide the lateral movement of the head carrier 68 upon rotation of the positioning knob 71.

Figure 4:
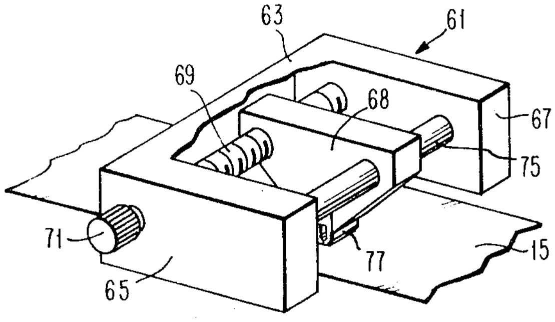
FIG. 4 is a perspective view of the head supporting and positioning mechanism of the cyclic tape buffer device; and FIGS. *5a–5b* show alternative cross-sectional views of conduit structures which may be utilized in accordance with my inventive embodiment.

Viewing FIG. 4, as the positioning knob 71 is rotated in one direction of rotation (e.g. clockwise), the head carrier 68 moves transversely of the tape in one direction (e.g. away from the rear wall 67 of the cover 63). Alternatively, upon rotation of the positioning knob 71 in an opposite direction of rotation (e.g. counterclockwise), the head carrier 68 moves transversely of the tape in another and opposite lateral direction (e.g. toward rear wall 67).

The head assembly 61 and its supported head carrier 68 are suitably positioned on the upper surface of the lower flat conduit section 27 so that the head 77, adjustably supported by carrier 68, extends through the upper wall of the lower flat section 27 for contiguous engagement with the tape 15.

It will be understood by those skilled in the art that other techniques for adjusting the transverse positioning of the head 77 relative to the tape 15, may also be provided. The head assembly 61 hereby disclosed is deemed to represent a preferred arrangement because of its very simplified construction and operation.

To substantially close the passageway 17 prior to operation of the cyclic tape buffer 11, after the insertion of a strip of tape 15 through aperture 14, a door 79 is provided. The door 79 has a suitable knob 81 formed thereon, and it is rectangularly constructed to snugly cooperate with aperture 14. More particularly, the door 79 is pivotally supported on the upper surface of conduit 16, by means of a hinge 82 (FIG. 2). For locking door 79 in its closed position, a vertically offset detent tongue 83 is formed on the free end of door 79. When door 79 is closed, tongue 83 engages the upper surface of conduit 16 in the rotative path of pivoted latch element 85, so that when latch element 85 is rotated upon the upper surface of the conduit 16, this enables a raised shoulder of the latch element to engage the top of tongue 83. It will thus been seen that the tape access door 79 is locked closed by sandwiching detent tongue 83 between the raised shoulder of latch element 85 and the upper surface of the conduit 16 (as shown in FIG. 2).

Thus, after the insertion of the tape 15 into the passageway 17, by pushing it through the conduit loop, in either a clockwise or a counterclockwise direction, the tape insertion cover 79 is pivoted about hinge 82 (from its FIG. 1 position) into cooperative engagement with aperture 14 of the upper flat section 25 of the conduit (FIG. 2), to close the passageway 17 except for the openings 57 and 59 formed therein. Upon energization of the air flow driving mechanism 13, the fan then blows air through the passageway in the direction shown by the arrows in FIG. 2. As the air moves through passageway 17 in a counterclockwise direction, the tape strip 15 is propelled uniformly in a counterclockwise direction so that the head 77 of head assembly 61 may read or write information on or from the magnetic tape strip 15.

As previously mentioned, the median length for passageway 17 of loop-shaped conduit 15 is slightly greater than the extended length of the tape strip 19 within the passageway. As a result, the ends 15*a* and 15*b* of the tape strip 15 are disposed in contiguity. When the tape 15 moves in a counterclockwise direction through the passageway, its operation is analogous to that of a continuous tape loop in view of the dimensional relationship between the tape 15 and the passageway 17. Thus, all of the benefits of a continuous tape loop are provided in my cyclic tape buffer 11 with a much more simplified and economical utilization of tape strip material 15.

Figure 5A:
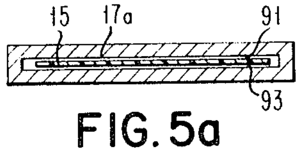
Figure 5B:
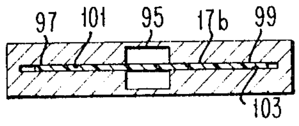

Since an air flow driving mechanism is utilized for propelling the tape strip 15 within the passageway 17 at a constant rate of speed, it is important to provide a controlled frictional relationship between tape and passageway during movement of the latter. FIGS. 5*a* and 5*b* illustrate two cross-sectional configurations for the passageway 17, which may be effectively utilized in the tape buffer mechanism.

FIG. 5*a* shows the cross-section 17*a* of a conduit passageway 17 having a flat, oblong configuration. The tape strip 15 has a uniform depth of slightly less than the uniform vertical distance between the upper and lower horizontal surfaces 91, 93 of the passageway 17, so that the tape 15 may be "floated" through the passageway 17, as shown in FIG. 2, with equalized air flow on the bottom and top of the tape strip tending to substantially reduce friction between the tape strip and the conduit passageway.

FIG. *5b* shows the cross-section **17*b* of a conduit passageway 17 having a center channel 95 and a pair of laterally opposed side channels 97, 99. The magnetic tape strip 15 has a uniform depth of slightly less than the uniform vertical distance between the upper and lower horizontal surfaces 101, 103 of the passageway 17. The center channel 95 serves to help control the air flow on top and bottom of a tape strip 15 driven through the conduit, while also controlling possible friction between the tape and conduit passageway. The operation of tape through a conduit having a cross-section 17*b*, is otherwise similar to that of cross-section 17*a***.

Figure 6:
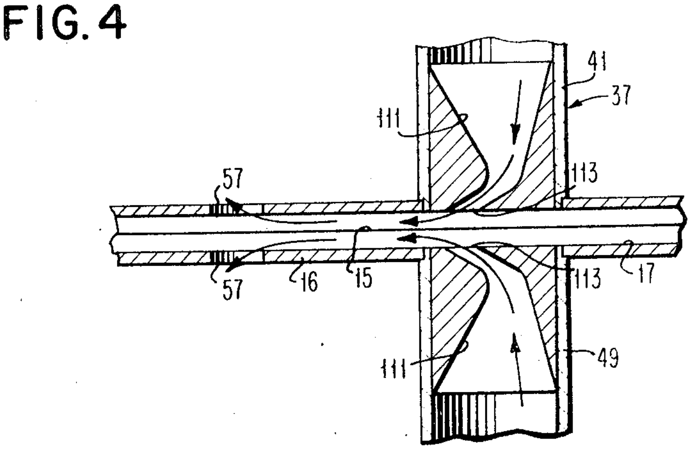
FIG. 6 is an enlarged detail view of a preferred coupling arrangement of the device.

FIG. 6 illustrates an enlarged detail view of a preferred form of coupling between the L-shaped sections 41, 43 of the flow-diverter tubes 37 and conduit passageway 17. As shown therein, the downwardly and upwardly directed ends of diverter sections 41, 43 each have ensconced in their outlet ends a nozzle 111. Each of the nozzles 111 is shaped to provide a fan-driven flow of air which enters passageway 17 at port 113 and tends to leave passageway 17 at an adjacent aperture 57 or 59 so that driven air impinges upon a surface of the tape strip 15 in a generally tangential fashion, thus exerting a directional force upon the tape to move it through passageway 17. Since the nozzles 111 are placed in opposition, as shown in FIG. 6, the air flows entering the passageway 17 at ports 113, tend to buoy up and float the tape through the passageway. This enables the tape to be driven very rapidly through conduit 16.

It will be understood by those skilled in the art, that the sizes of the orifices or ports 113 and the overall nozzles 111, might not necessarily be the same, but may be varied in accordance with demands of the overall system, for the purpose of floating tape strips through the loop-shaped passageway in the most effective fashion, at the desired speeds.

It will now, therefore, be seen that the new and improved cyclic tape buffer of the present invention is simplified in structure, efficient in operation, and utilizes strip tape material to achieve an overall operation tantamount to that of a continuous loop, cyclic tape buffer, at minimal cost. In addition, the aforesaid device effectively facilitates the use of an air flow driving mechanism in conjunction with the tape strip material.

While in accordance with the Patent Statutes, I have described what at present is considered to be the preferred aspect of this invention, it will be obvious to those skilled in the art that various changes or modifications may be made therein without departing from the present invention.

What I claim is:

1. A cyclic tape buffer for a flexible tape strip, comprising a loop-shaped conduit having a continuous passageway disposed therein;

said passageway having a predetermined median length and being structured to receive an elongated strip of flexible magnetic tape;

said strip of tape having a length approximating the predetermined median length of said passageway so that when said strip is disposed in said passageway the free ends of said strip abut each other;

entrance and exit means for placement of said tape strip in the passageway of said loop shaped conduit, and removal of said tape strip from said passageway;

means for blowing air through said passageway;

means for directing the flow of air in a singular direction through said passageway, thereby to drive said strip of flexible tape in said direction;

and transducer means disposed adjacent said conduit for reading from said tape strip and writing upon said tape strip during its movement through said conduit, whereby the entrapment of said tape strip in said passageway and its movement therein provide the functional advantages of a continuous magnetic tape loop while allowing the use of elongated strip material in said cyclic tape buffer.

2. The cyclic tape buffer of claim 1 wherein said blowing means includes a fan, and a flow diverter means for coupling the output of said fan to said conduit; said flow diverter means including at least one pair of output nozzles directed toward each other; said output nozzles being coupled to opposite sides of said passageway to provide a continuous fan-driven air flow at the top and bottom of a flexible tape strip disposed in said passageway.

3. The cyclic tape buffer of claim 2 wherein the flow directing means is a pair of opposed apertures formed in the walls of said conduit, and located adjacent to, but downstream of the output nozzles of said diverter means.

4. A cyclic tape buffer for a flexible tape strip, comprising a loop-shaped conduit having a continuous and substantially closed passageway disposed therein;

said passageway having a predetermined median length and a substantially uniform flat and rectangular cross-section, for receiving an elongated strip of flexible magnetic tape;

said strip of tape having a length slightly less than the predetermined median length of said passageway so that when said strip is disposed in said passageway the free ends of the tape are between 0 inch and 0.020 inch apart per foot of tape;

entrance and exit means for placement of said tape strip in the passageway of said loop-shaped conduit, and removal of said tape strip from said passageway;

means for blowing air through said passageway, said blowing means including a fan, and a plurality of pairs of output nozzles coupled to said fan, each pair of said output nozzles being directed generally toward each other and coupled to opposite sides of said passageway, thereby to couple the output of said fan to said conduit and provide a continuous fan-driven air flow at the top and bottom of a flexible tape strip disposed in said passageway, thereby to float said tape along the median length of said passageway and at a uniform velocity;

means for directing the flow of air in a singular direction through said passageway, said flow directing means including a plurality of pairs of opposed apertures formed in the walls of said conduit, each pair of said apertures being located adjacent to, but downstream of a pair of said output nozzles of said air blowing means, thereby to drive said strip of flexible tape in said singular direction;

and transducer means disposed in communication with said conduit for reading from said tape strip and writing upon said tape strip during its movement through said conduit, whereby the entrapment of said tape strip in said passageway and its movement therein provided the functional advantages of a continuous magnetic tape loop while allowing the use of elongated strip material in said cyclic tape buffer.

* * * * *